(12) United States Patent
Pernyeszi

(10) Patent No.: US 9,537,329 B2
(45) Date of Patent: Jan. 3, 2017

(54) BATTERY MANAGEMENT CIRCUIT MAINTAINING CELL VOLTAGES BETWEEN A MINIMUM AND A MAXIMUM DURING CHARGING AND DISCHARGING

(71) Applicant: Joe Pernyeszi, Scotts Valley, CA (US)

(72) Inventor: Joe Pernyeszi, Scotts Valley, CA (US)

(73) Assignee: General Electronics Applications, Inc., Scotts Valley, CA (US)

( * ) Notice: Subject to any disclaimer, the term of this patent is extended or adjusted under 35 U.S.C. 154(b) by 186 days.

(21) Appl. No.: 14/517,618

(22) Filed: Oct. 17, 2014

(65) Prior Publication Data

US 2016/0064969 A1 Mar. 3, 2016

Related U.S. Application Data

(60) Provisional application No. 62/043,653, filed on Aug. 29, 2014.

(51) Int. Cl.
*H01M 10/46* (2006.01)
*H02J 7/00* (2006.01)

(52) U.S. Cl.
CPC .................. *H02J 7/0014* (2013.01)

(58) Field of Classification Search
CPC ...... H02J 7/0013; H02J 7/1423; H02J 7/0014; H02J 7/0019; H02J 7/0021
USPC ................... 320/116, 118, 119, 122
See application file for complete search history.

(56) References Cited

U.S. PATENT DOCUMENTS

| | | | |
|---|---|---|---|
| 7,400,114 B2 | 7/2008 | Anzawa et al. | |
| 8,183,870 B1 | 5/2012 | Davies | |
| 8,339,100 B2* | 12/2012 | Li .................. | H01M 10/42 320/118 |
| 2010/0237830 A1 | 9/2010 | Castelaz et al. | |
| 2012/0032641 A1* | 2/2012 | Yun .................. | H02J 7/0016 320/118 |

* cited by examiner

*Primary Examiner* — Edward Tso
(74) *Attorney, Agent, or Firm* — Davis Wright Tremaine LLP

(57) ABSTRACT

A battery management circuit maintains voltage balance during charging and discharging of a multi-cell, series connected battery stack. The circuit allows the entire energy content of the battery stack to be drained, as opposed to just monitoring the cells and turning off the discharge when the first cell voltage drops below a predetermined threshold. The circuit also provides high efficiency voltage balancing during charging of the battery stack conserving energy and keeping the temperature of the battery pack to a minimum.

10 Claims, 8 Drawing Sheets

BATTERY MANAGEMENT CIRCUIT MAINTAINING CELL VOLTAGES BETWEEN A MINIMUM AND A MAXIMUM DURING CHARGING AND DISCHARGING

BACKGROUND

This application relates to battery management circuits.

Battery management circuits monitor the voltage across each cell or a small group of cells. Upon discharge, the load is disconnected when any cell voltage drops below a predetermined value. During charging, when any cell voltage reaches a predetermined voltage, a shunt is activated and bypasses some of the charging current while the charging continues. When the battery stack voltage reaches a predetermined value, charging is terminated. Battery chargers typically use some form of switching converter with a voltage and current limiter having a plus terminal and a minus terminal.

SUMMARY

A battery management circuit includes a plurality of N cell connections by which a corresponding plurality of battery sections are connectable in series between a load output and ground such that the positive terminal of each battery section in the series is connected to the negative terminal of the subsequent battery section in the series, except that the negative terminal of the first battery in the series is connected to ground and that the positive terminal of the last section is connected to the load output. A balancing circuitry is connected across each of the cell connections, so that when a corresponding plurality of battery sections are connected to drive a load connected at the load output and when activated, the balancing circuitry uses one or more stronger ones of the batteries to provide a supplemental current across the connections of one or more weaker ones of the batteries. A controller circuit is connected to the cell connections to monitor the charge level of batteries connected to it and is connected to the balancing circuitry to activate the balancing circuitry in response to detecting one or more of the batteries being discharged below a first level.

Various aspects, advantages, features and embodiments are included in the following description of exemplary examples thereof, which description should be taken in conjunction with the accompanying drawings.

DETAILED DESCRIPTION

Figure 1:
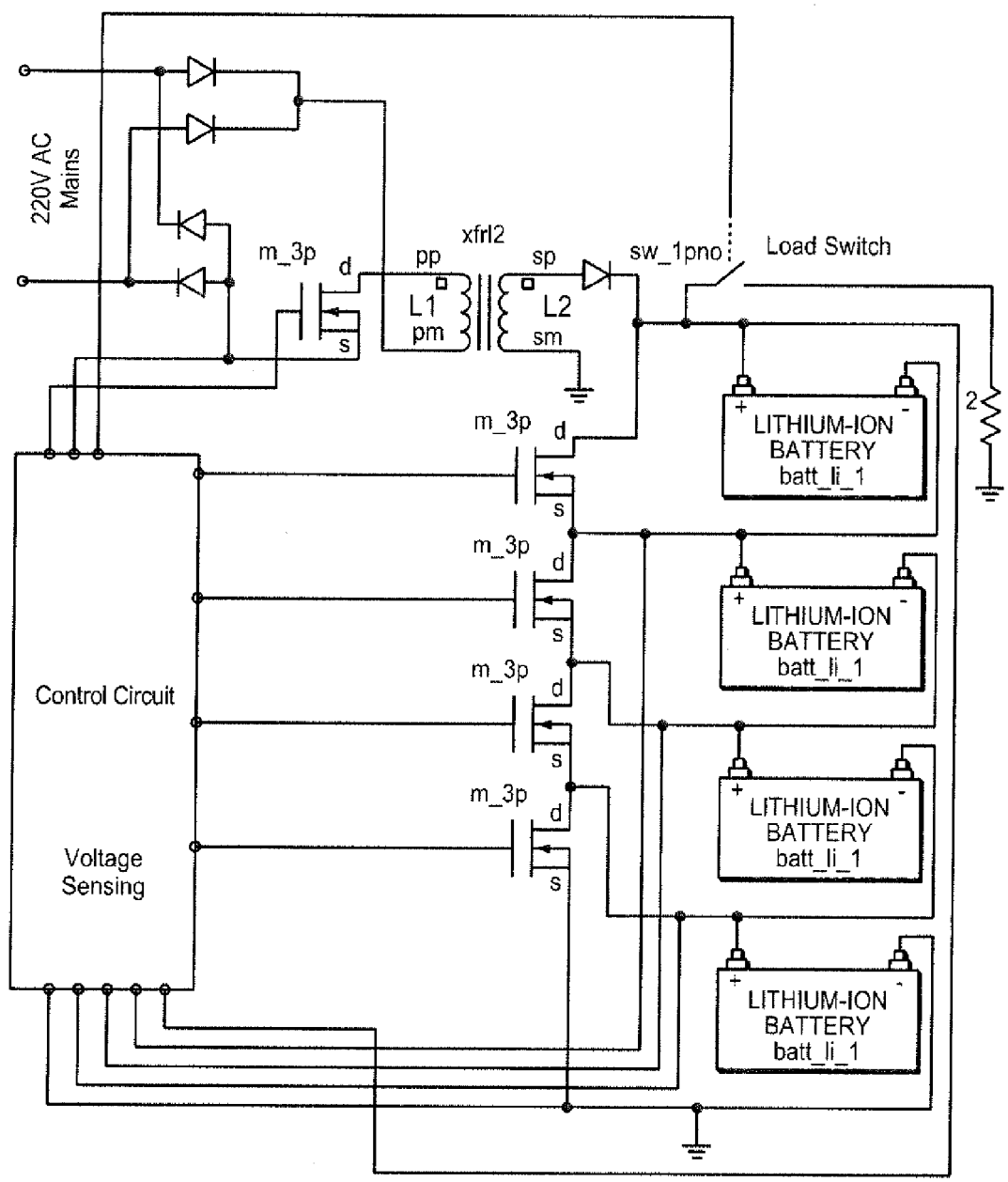
FIG. 1 shows one example of a battery management circuit.

Battery operated apparatus such as cordless tools, electric vehicles and backup systems (UPS) normally use multiple cell battery packs. The series connected multi-cell arrangement raises the output voltage to facilitate reduced current operation for a given power output. The increased voltage also matches the application to the available, low cost components to build the application circuits. The series connected cell stack provides that each cell works with the same current, both when charged and discharged. The individual cells in a typical battery pack are identical cells by design, but the cells have manufacturing tolerances and they are not exactly the same capacity. When charging such an imperfect battery pack, the smallest capacity cell will be fully charged before the other, slightly higher capacity cells. Overcharging a cell damages the cell and shortens its life significantly. To prevent the overcharging, the voltage across each cell is monitored and either the charging is terminated or a shunt is activated when the cell voltage reaches a predetermined value. The shunts bypass some of the charging current from the cell, thereby preventing it from being overcharged while the charging continues to fully charge the other cells.

When the battery pack is being discharged, the same cell voltage monitoring circuit will disconnect the load when any cell voltage drops below a predetermined voltage. A weak cell in the series cells will be exhausted before other cells. When a cell is discharged and the load is still connected, the other cells in the battery still supply current to the load and the voltage across the discharged cell will collapse and could eventually reverse polarity as the discharge continues. Terminating the discharge is necessary to prevent a weaker cell from getting damaged by preventing it from polarity reversal.

By way of example, if the circuit has a 10 Ah battery with one weak cell whose capacity is only 9 Ah, during charging the shunt across the 9 Ah will be activated while the other cells will still be charging until all cells are fully charged. During discharge the 9 Ah cell will be the first to be exhausted and the voltage across it will start dropping. Since the other cells in the battery still have 1 Ah left in them, they continue to supply current. Due to the series connection this current will go through the 9 Ah cell and attempts to discharge it further. As the voltage keeps dropping, the battery management circuit detects that the 9 Ah cell has a very low voltage across it and disconnects the load. The result is that due to this protective action, the battery can only supply power as a 9 Ah battery. In other words, the total battery capacity has been reduced to the rating of the weakest battery.

Manufacturers have been characterizing the individual cells and when assembling a battery pack, use cells of similar capacity. This allows for all the cells to be charged or discharged at about the same time. The cells are binned according to their measured capacity. By way of example: if a 10 Ah battery pack is to be manufactured, then the individual cells are categorized into bins, such as 9.7 to 9.8, 9.8 to 9.9, 9.9 to 10, 10 to 10.1, 10.1 to 10.2 and 10.2 10.3 Ah. Battery packs are then assembled from the same bin.

A typical battery management circuit monitors the voltage across each cell or a small group of cells. Upon discharge, the load is disconnected when any cell voltage drops below a predetermined value. During charging, when any cell voltage reaches a predetermined voltage, a shunt is activated and bypasses some of the charging current while the charging continues. When the battery stack voltage reaches a predetermined value, charging is terminated. An example is shown in FIG. 1.

FIG. 1 shows an example of a battery management circuit. It includes 4 battery cells, a control circuit, a switching converter for charging and 4 shunt dmos transistors. The control circuit monitors the cell voltages in the battery and activates one or more of the shunt dmos transistors to prevent the overcharging of the weaker, lower capacity cells. The single source charging circuit with the dmos switch and the transformer regulates the current that goes through each cell.

In an exemplary embodiment presented here, a battery management circuit maintains voltage balance during charging and discharging of a multi-cell, series connected battery stack. The circuit allows the entire energy content of the battery stack to be drained, as opposed to just monitoring the cells and turning off the discharge when the first cell voltage drops below a predetermined threshold. The circuit also provides high efficiency voltage balancing during charging of the battery stack conserving energy and keeping the temperature of the battery pack to a minimum.

Figure 2:
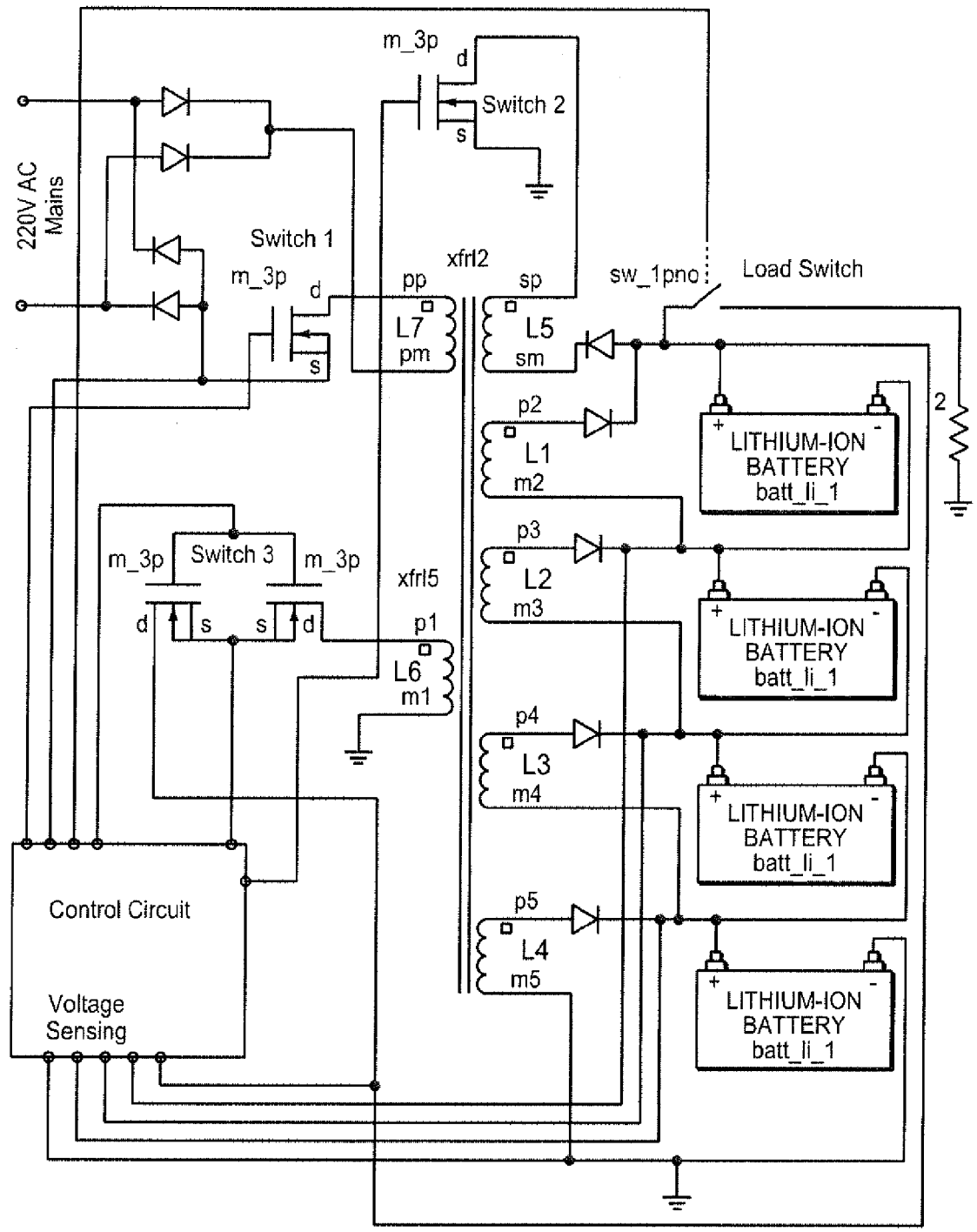
FIG. 2 shows an exemplary embodiment of a battery management system.

FIG. 2 shows an exemplary embodiment for battery management system. It has a multi-output transformer with a dedicated winding to charge each cell independently, windings L1-4, and a common higher voltage winding L6 that charges the battery through switch 3 which is operated as a synchronous rectifier, 4 batteries, a control circuit with voltage sensing circuitry, a bridge rectifier to turn the 220V AC to DC, switch 1 that forms a switching converter with L7 and voltage balancing circuit comprising switch 2 and L5. In FIG. 2 the circuit is connected to a load, represented by the resistor, by a load switch controlled by the control circuit. Depending on the application, the load may or may not be disconnected when the circuitry is charging the battery, where the load may only be disconnected when the battery main terminal voltage is at or below its minimum value. In some applications, such as for a vehicle, charge can be done and may even be advisable whenever the power is available to do so.

The battery management circuit as shown on FIG. 2 has a voltage sensing circuit that monitors the voltage across each cell or a small group of cells and a switching converter with two switching transistors. The switching converter has multiple, equal voltage outputs that are connected to each cell or a small group of cells as shown on FIG. 2. Upon discharging the battery the cell voltages slowly drop as the battery is supplying power to the load. When any cell voltage in the battery drops below a predetermined level, the switching converter, here switch 2 and L5, is activated and provides a shunt current to the cell such that current from the weak cell is augmented by the shunt current supplied by the switching converter to maintain a minimum voltage across the cell.

The power to provide the shunt current to the weak cell comes from the main terminals of the battery, more precisely from the stronger cells of the battery pack. This process of power transfer continues until the entire stored energy of the battery pack is used up. When the main battery terminal voltage reaches a predetermined voltage, the load is disconnected and the switching converter is deactivated to stop the discharge of the battery. The transformer has two primary windings and it is the second primary L5 that is activated with switch 2. Switch 2 is best implemented using a low voltage dmos transistor appropriate for the particular battery capacity and battery voltage.

Upon charging the battery, switch 1 and primary L7 is activated so that isolation from the power mains is provided. The circuit uses a switch, switch 3, to provide synchronous rectification to provide high efficiency and a slightly higher voltage to charge the battery on its main terminals. During this operation the other secondary windings L1-4 are inactive as there is not enough voltage on those windings to turn on the diodes. As the battery is being charged, the cell voltages are increasing and eventually one or more cells will have a high enough voltage approaching the fully charged terminal voltage for those cells. For example, this could happen when the battery is, say, at 90-95% charged of its capacity. When this condition is reached, the synchronous rectifier is deactivated, the charging is switched over to the balancing circuit and the current is reduced. Now only the stronger cells will be charged as they are further from their full capacity than the weaker cells. The weaker cells still receive a trickle of a current but the bulk of the power is directed to those cells that have not yet reached their full capacity. And since the overall charging current is reduced, the charging is finished with a more gentle current which helps reduce the temperature rise of the individual cells. The gentle topping off the batteries helps extend the useful life of the batteries and is recommended by most battery manufacturers.

The exemplary battery management system is implemented by using the flyback concept for the switching converter. Other topologies, such as forward converter concept or the resonant converter concept can also be used for the switching converter without deviating from the principle of operation for the new battery management circuit which allows for charging a battery with high efficiency without resistive shunts used in the prior art or having to terminate the discharge of the battery as soon as the weakest cell in the battery gets exhausted.

An additional benefit can be realized during manufacturing. Since this battery management circuit can balance the cell voltages, and it does that at high efficiency, the battery pack can be assembled out of somewhat different capacity batteries. The weaker cells will be helped by using energy from the stronger cells as the battery pack is nearing the end of its capacity. Instead of using the time consuming and expensive binning process, battery packs can be assembled from all the cells from the initial battery tests in the manufacturing line that meet the minimum capacity specification. In other words and using the above example, if the cells are classified as "good" if their capacity is above 9.7 Ah, then all "good" cells are suitable for use in a battery pack. This of course means that some cells will have a capacity of 9.7 Ah while some other cells maybe 10.3 Ah or even more. When the battery pack is charged, all cells will be charged to their full capacity without the weaker cells being overcharged. When the battery pack is being used and is discharging, all cells will be exhausted at the same time as the battery management circuit will balance the cells so energy is transferred from the stronger cells to the weaker cells so that the voltage on the weaker cells cannot drop below a specified voltage that is high enough to prevent the cell from being damaged.

As noted above, the circuitry of FIG. 2 has the feature of balancing of the battery loading and providing protection for a somewhat lower capacity, weak cell. The circuit of FIG. 3 is a subset of the circuit shown on FIG. 2 where, for clarity of explanation, only those components are shown that operate during the discharge of the battery and are actively work to balance the cells.

Figure 3:
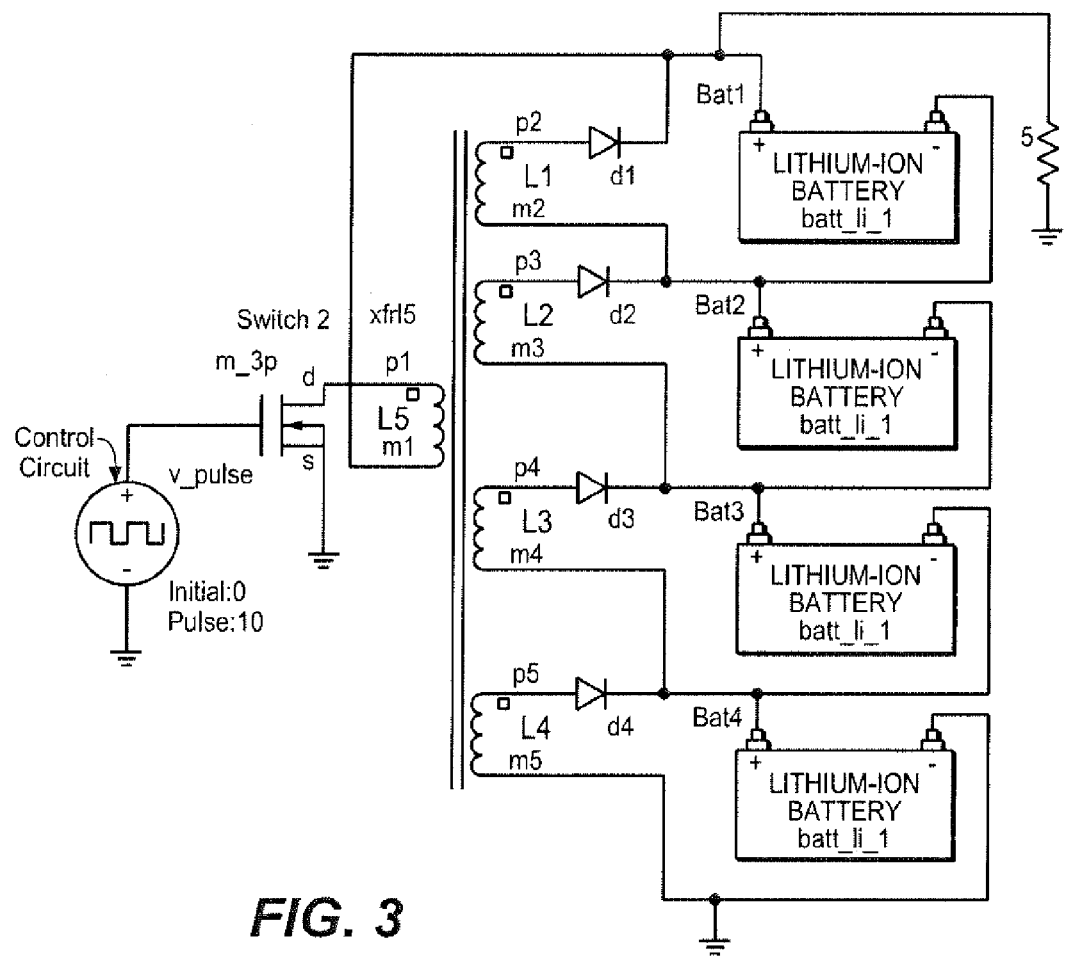
FIG. 3 is illustrates some of the elements of FIG. 2.
Figure 4:
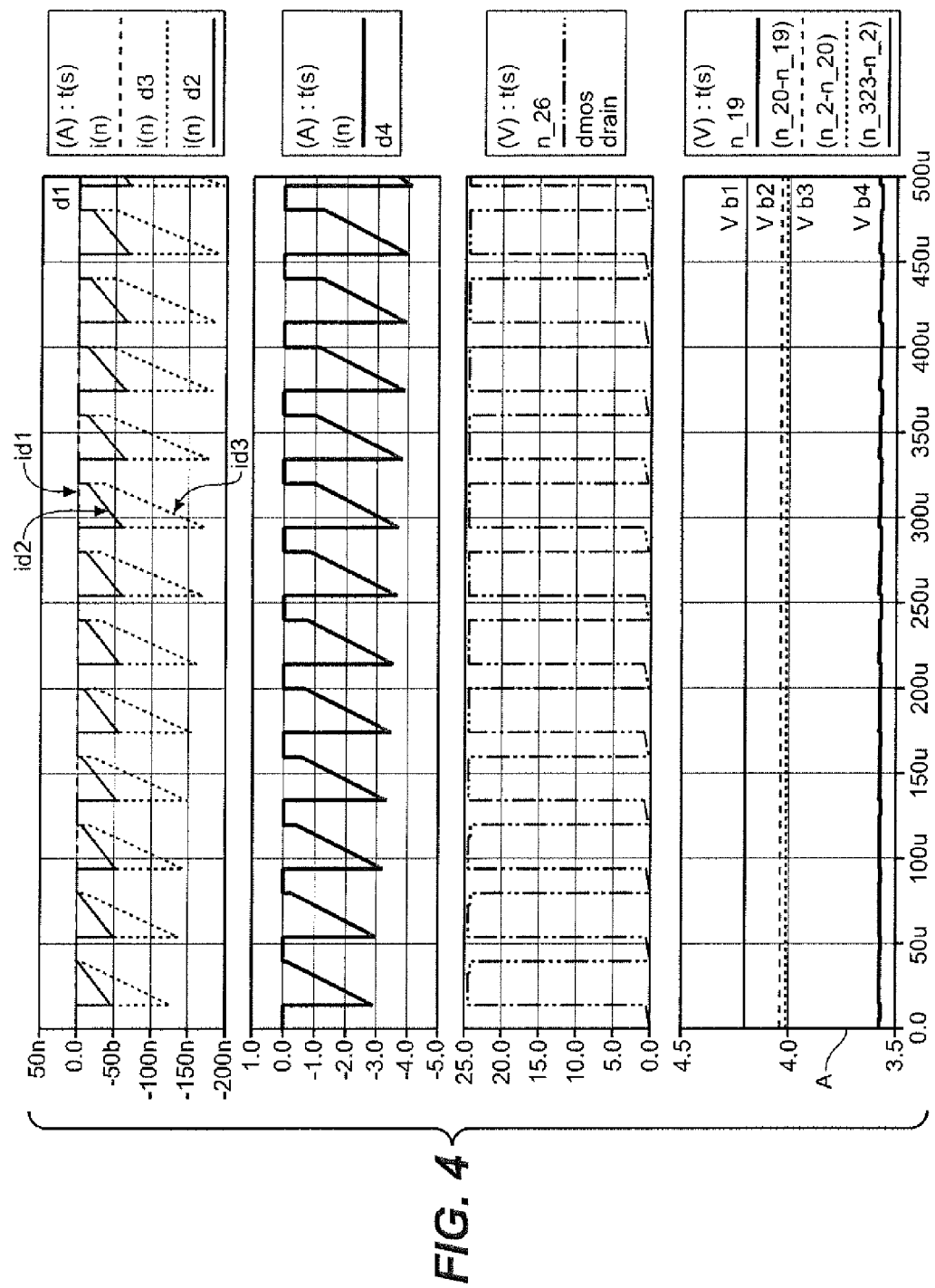
FIG. 4 is a set of waveforms illustrating the operation of some elements of FIG. 3.

To illustrate the operation of FIG. 3, an example is taken where Bat1 is still near its full charge as it is a strong cell, Bat2 and Bat3 are somewhat discharged and Bat4 is almost fully discharged as it is a cell that has degraded capacity. This is shown on stripe 4 of FIG. 4. Since the voltage across Bat4 is only 3.6V, the monitor circuit detected that this cell is almost completely discharged. The controller then activates the balancing circuit and the dmos transistor switch 2 starts switching and transfers energy to Bat4 to keep its voltage from collapsing. In the exemplary embodiments, switch 2 and others of the switches are implemented as dmos transistors, but other switches can be used as appropriate for the application with the control circuitry designed to deliver the suitable control voltage to the effect the proper operation of the switch.

The balancing function is illustrated here by using a flyback converter. The wave forms on FIG. 4 were obtained from a computer simulation. The top two stripes show the current through the diodes and the first 3 diodes, d1, d2, d3 only conduct nanoamps of current. However, the diode connected to Bat4 conducts 3-4A peak, attempting to hold up the voltage across Bat4. As such, the discharge does not have to be terminated and the battery is still supplying power to the load. Stripe 4 shows the individual cell voltages and the voltage is held at a safe level for Bat4, preventing a deep discharge that would damage the battery. The level indicated at "A" in stripe 4 schematically represents a level at which the balancing circuit would be activated. The circuit can be used to work with various kinds of batteries such as Ni—Cd, Ni—MH, lead-acid, and so on, where the value of this level will be generally be different for different battery types.

If, as in a conventional battery management circuit, the voltage across Bat4 were allowed to collapse, the full terminal voltage of the battery would dip low enough to trigger the protection circuit and the load would be disconnected. At that point the battery would need to be taken out of service and charged, even though the battery still has most of its energy. The digital controller of FIG. 2 monitors the cell voltages and operates the DC/DC converter to more fully use up the energy stored in the battery.

Figure 5:
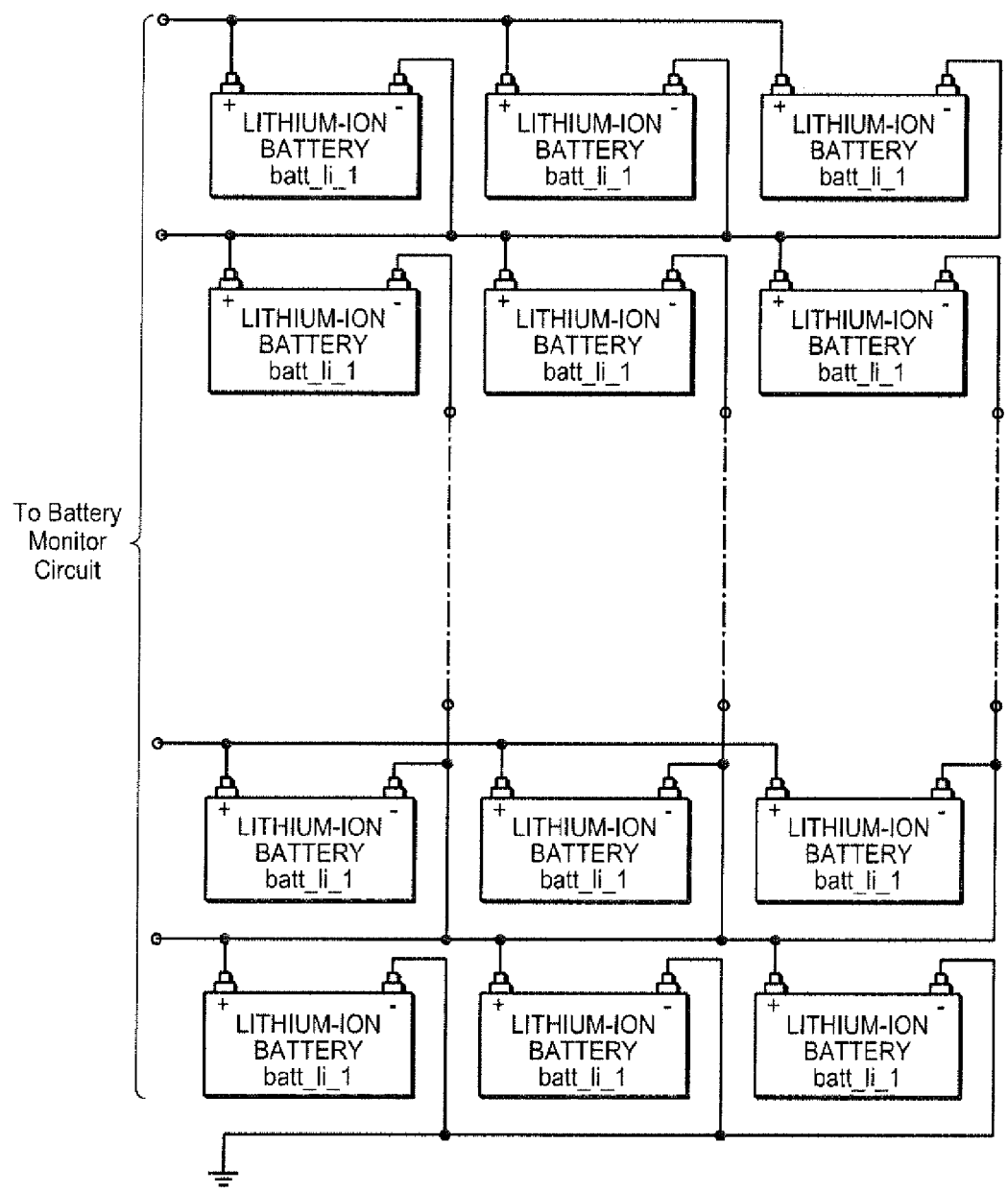
FIG. 5 illustrates connected multiple batteries in series at each level to provide higher current levels.

Battery packs having to supply larger current than is possible with a single string of series connected batteries can still be managed by the type of circuit shown in FIG. 2. In such applications, of which a small electric vehicle is a good example, several strings of series connected batteries are connected parallel as shown on FIG. 5. In the case of such a high capacity battery the simple cell monitoring and balancing functions can be implemented by connecting the cells of the several strings parallel such that the cell capacities add together while the voltage will be the same on these parallel connected cells. A common Li-ion cell size is 4.4 Ah at a fully charged voltage of 4.2V. By way of example, having 3 strings of cells, each string containing 50 cells, we get a 13.2 Ah battery whose terminal voltage is 220V. The total energy contained in such a battery is 2.9 kWh, sufficient for a small vehicle in town. Building much larger batteries based on the same principle as demonstrated and shown on FIG. 5 allows the battery management circuit to provide voltage balancing for the charge and discharge of a large battery suitable for powering a city bus. Such a large battery would have many parallel strings, possibly 100 or more, but as long as the cells of each string are connected parallel with the cells from the other strings, the battery management circuit will work the same as it does for a single string.

Figure 6:
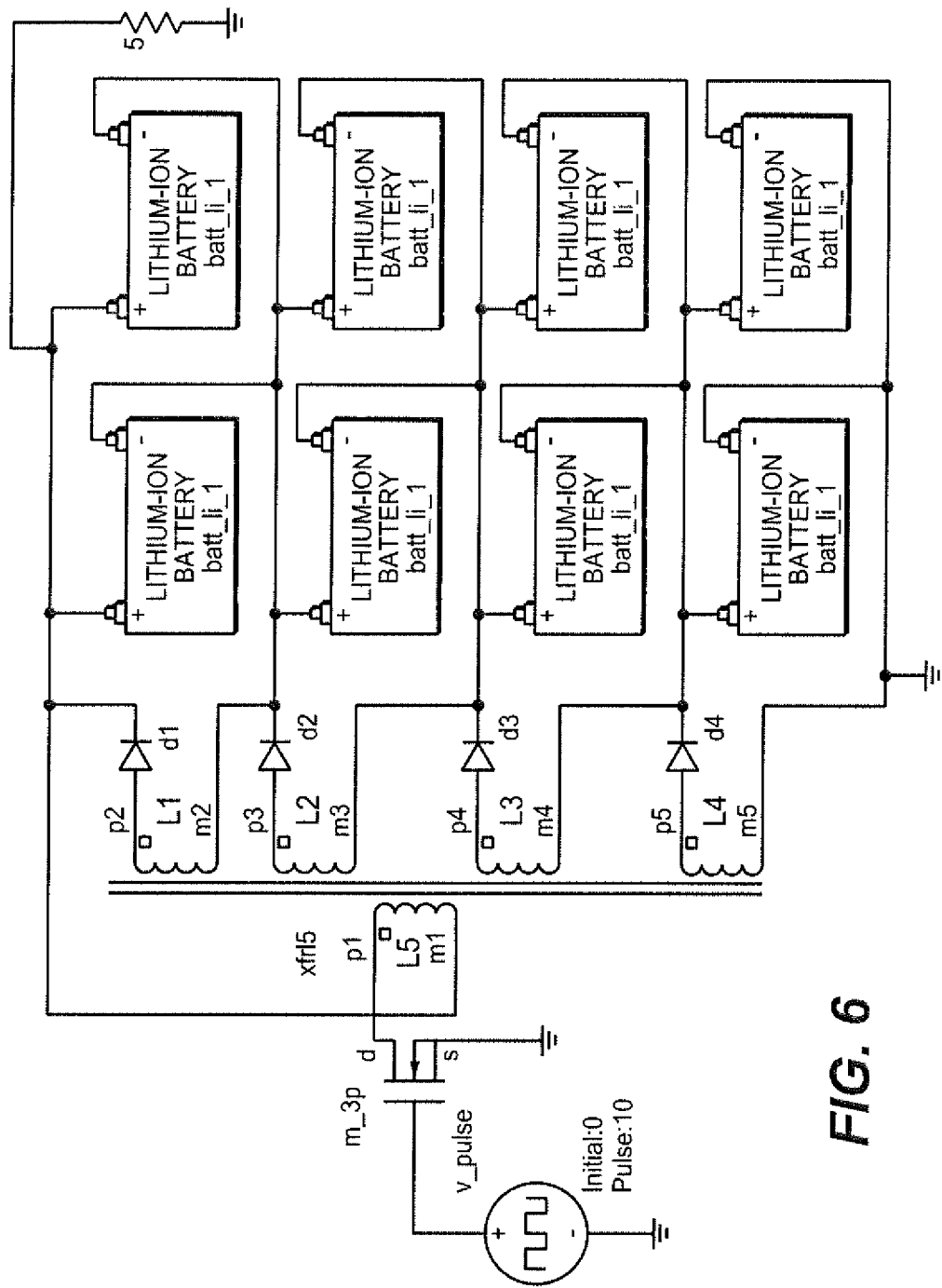
FIG. 6 is similar to FIG. 3, but with multiple batteries connected in parallel at each level.

A simple, 2 string battery pack in which each string has only 4 cells for simplicity is shown on FIG. 6 for the balancing mode of operation. As can be seen on FIG. 6, the battery capacity goes from 4.4 Ah to 8.8 Ah and the waveforms shown on FIG. 4 essentially stay the same.

In a vehicle application the power demand can rise very quickly, but such increase is short in time. Nevertheless, such high load current events are detrimental to the life expectancy of the battery. In such application the use of super capacitors is beneficial in that the capacitors supply the short duration high current demand and greatly reduces the stress on the batteries. Since super capacitors are only available with low voltage ratings, 2.5-4.5V, they are connected in parallel with each cell and look like an extra string of battery cells. Super capacitors are routinely used in demanding applications and their use is fully compatible with the battery management circuit. They improve the overall system performance because batteries, when they are close to being fully discharged and have only 15-20% of their capacity left, normally exhibit a higher internal resistance. A sudden high current demand will lower the cell voltage and may temporarily trigger the low battery condition to be detected and activate the battery management circuit. Having the super capacitors supply the extra current prevents a false alarm indicating a low battery condition. However, when a cell is almost completely discharged, retaining only 3-5% of its capacity, the terminal voltage drops on a permanent basis which cannot be compensated for by the super capacitors and then the battery management circuit is activated providing the necessary voltage balancing of the cells.

Figure 7A:
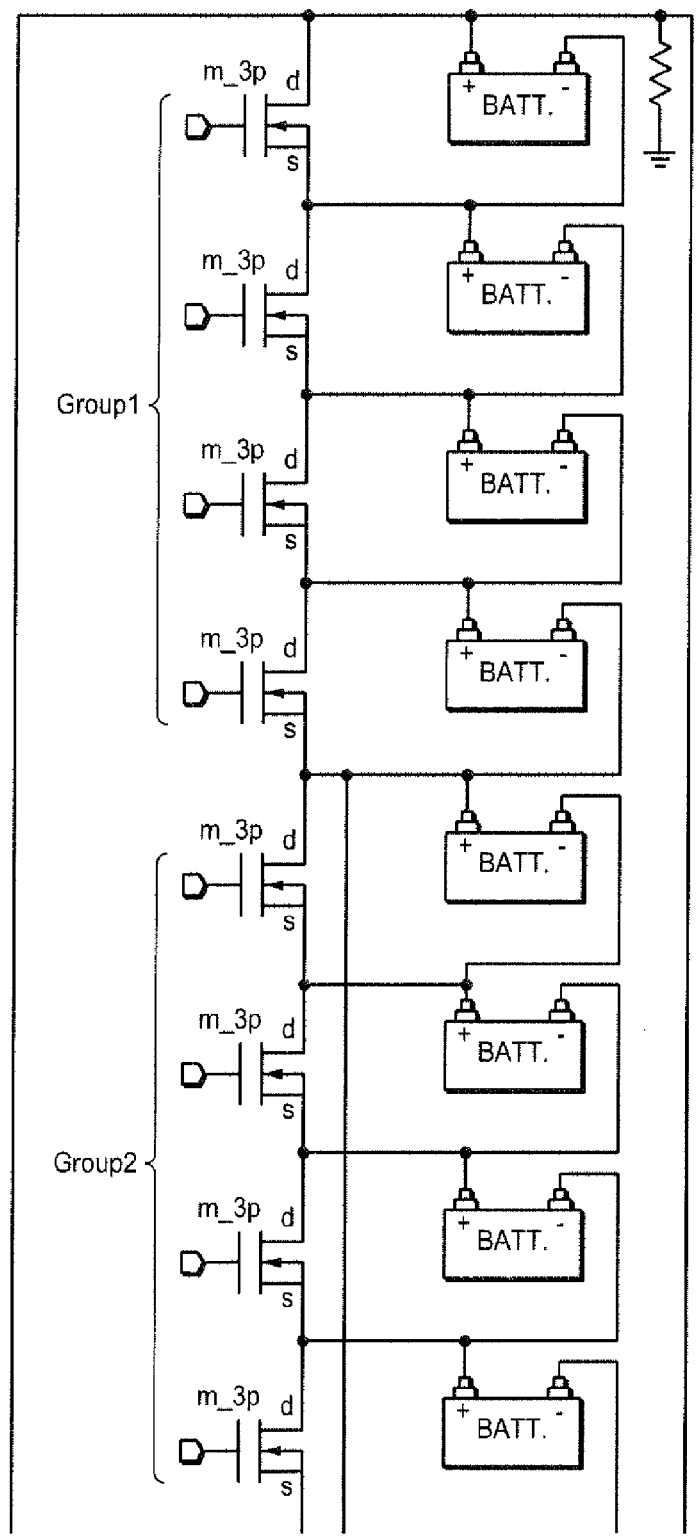
FIG. 7 is formed of the two sheets FIGS. 7A and 7B and is similar to FIG. 3, but with multiple groups of batteries and shunt transistors.
Figure 7B:
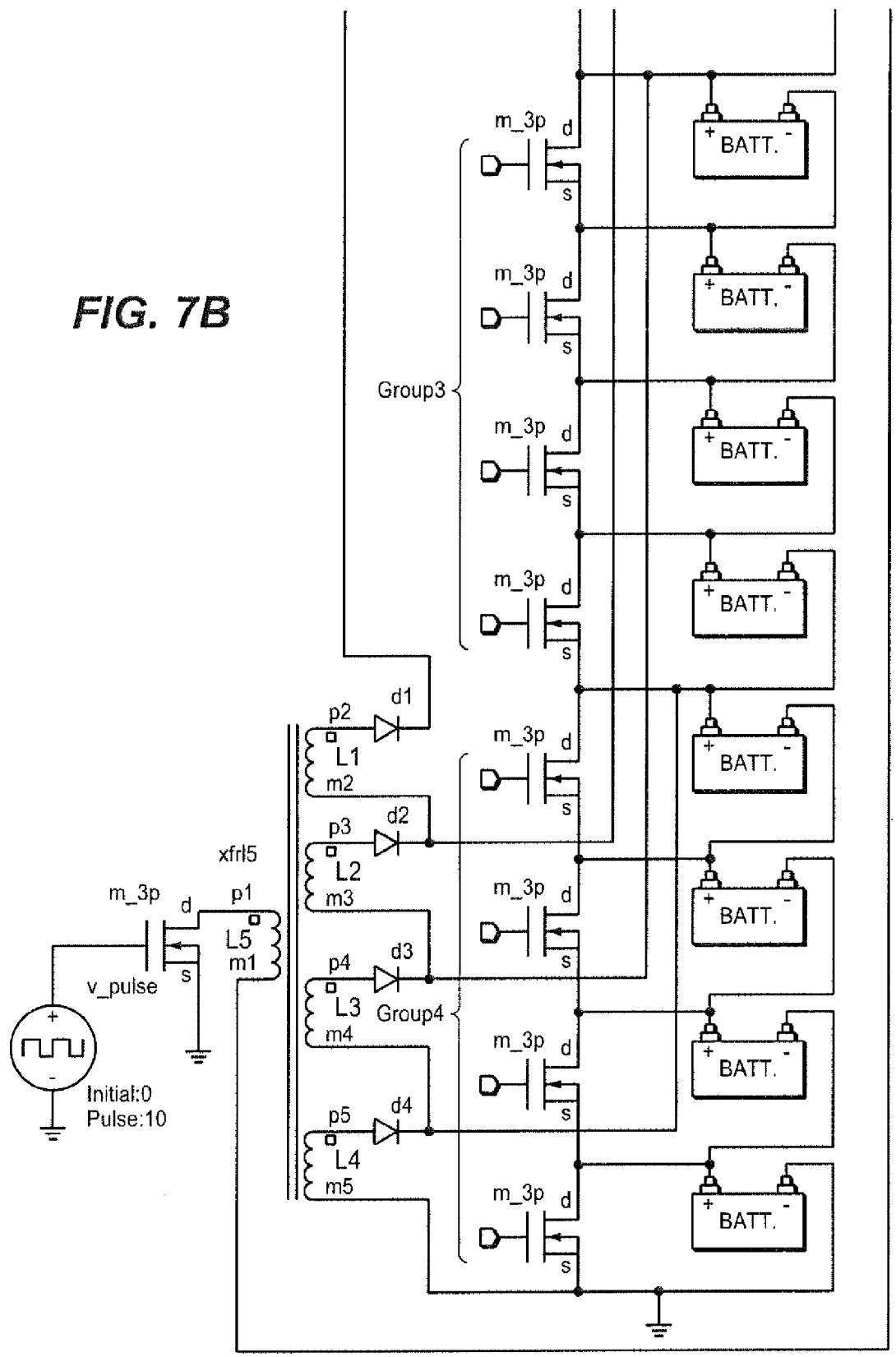

In another set of embodiments, a mixture of the shunt transistor of FIG. 1 and the balancing circuitry of FIG. 2 can be used. An example is illustrated in FIG. 7. In the example of FIG. 7 there are 4 groups of batteries, each having 4 cells. The balancing circuit can balance the groups but not the individual cells. This circuit has only four secondary windings, one for each of the groups, yet it balances 16 batteries. The shunt transistors are passive during discharge. When the voltage across any group drops below a predetermined level, the switching transistor is activated and the voltage on the weak group will be held up by the battery management circuit.

During charging, the group voltages will be balanced by the circuit similarly to what balancing is done to each cell as shown on FIG. 3, but within the groups the appropriate shunt is activated to prevent an individual cell overcharge. A variant of this circuit would be one that leaves out the shunt transistors. In this case charging would be terminated when the voltage across a group would reach a certain level, analogous to the circuit where each cell has its own secondary winding, at which point the charging would be switched from the main terminals to the balancing operation of the circuit with the reduced charging current. While it would be possible to overcharge a weak cell in a group, the severity of the overcharging would be reduced compared to a system with no battery management.

The foregoing detailed description has been presented for purposes of illustration and description. It is not intended to be exhaustive or to limit the above to the precise form disclosed. Many modifications and variations are possible in light of the above teaching. The described embodiments were chosen in order to explain the principles involved and its practical application, to thereby enable others to best utilize the various embodiments and with various modifications as are suited to the particular use contemplated. It is intended that the scope be defined by the claims appended hereto.

It is claimed:

1. A battery management circuit, comprising:
   a plurality of cell connections whereby a corresponding plurality of battery sections are connectable in series between a load output and ground such that the positive terminal of each battery section in the series is connected to the negative terminal of the subsequent battery section in the series, except that the negative terminal of the first battery section in the series is connected to ground and that the positive terminal of the last battery section is connected to the load output;

balancing circuitry connected across a plurality N of the cell connections whereby, when a corresponding plurality of battery sections are connected thereto to drive a load connected at the load output and when activated, the balancing circuitry is configured to provide a supplemental current across the connections of one or more weaker ones of the battery sections from one or more stronger ones of the battery sections;

a controller circuit connected to the cell connections to monitor the charge level of batteries connected thereto and connected to the balancing circuitry to activate the balancing circuitry in response to detecting one or more of the battery sections being discharged below a first level; and charging circuitry connected to the controller circuit, coupled to the cell connections, and having an AC input, wherein in response to the controller circuit detecting the voltage across the plurality of cell connections being at or below a second level of discharge, the controller circuitry activates the charging circuitry, where the second level of discharge is a minimum allowable terminal voltage of the batteries.

2. The battery management circuit of claim 1, wherein each of the cell connections allow for connection of a plurality of batteries connected in series.

3. The battery management circuit of claim 1, wherein the balancing circuitry includes:

a plurality of N first windings of a transformer each connected across a corresponding one of the cell connections;

a plurality of N first diodes through which each of a corresponding one of the first windings are connected to the positive terminal connection of a corresponding cell connection;

a switch connected to the controller circuit; and a second winding of the transformer connected between the load output and, through the switch, ground, wherein the first windings and second winding are part of the same transformer.

4. The battery management circuit of claim 3, wherein the switch is a low voltage dmos transistor connected between the second winding and ground and having a gate connected to the controller circuit.

5. The battery management circuit of claim 4, wherein, when the balancing circuitry is activated, the controller circuit applies a series of pulse to the gate of the dmos transistor.

6. The battery management circuit of claim 1, further comprising:

a load switch connected to the controller circuit, through which load output is connectable to the load, wherein in response to the controller circuit detecting the voltage across the plurality of cell connections being at or below the second level, the controller circuitry opens the load switch.

7. The battery management circuit of claim 1, wherein the balancing circuitry includes:

a plurality of N first windings each connected across a corresponding one of the cell connections; and a plurality of N first diodes through which each of a corresponding one of the first windings are connected to the positive terminal connection of a corresponding cell connection; and wherein the charging circuitry includes:

a first switch connected to the controller circuit;

a second winding connected between ground and, through the first switch, the load output, wherein the first windings and second winding share a common core;

a bridge rectifier having the AC input;

a switching converter connected to the bridge rectifier and inductively coupled to the first windings.

8. The battery management circuit of claim 7, wherein the first switch comprises a pair of dmos transistors connected in series between the second winding and the load output and having gates connected to the controller circuit.

9. The battery management circuit of claim 7, wherein the switching converter includes:

a second switch connected to the controller circuit and connected across the bridge rectifier; and a third winding connected, through the second switch, across the bridge rectifier and sharing a common core with the first windings and second winding.

10. The battery management circuit of claim 9, wherein the second switch is a dmos transistor having a gate connected to the controller circuit.

* * * * *